(12) United States Patent
Suga

(10) Patent No.: US 9,554,325 B2
(45) Date of Patent: Jan. 24, 2017

(54) SYSTEM, APPARATUS, AND METHOD FOR DETERMINING SIGNAL QUALITY WITH MULTIPLE ACCESS POINTS

(71) Applicant: FUJITSU LIMITED, Kawasaki-shi, Kanagawa (JP)

(72) Inventor: Junichi Suga, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 35 days.

(21) Appl. No.: 14/340,429

(22) Filed: Jul. 24, 2014

(65) Prior Publication Data

US 2015/0055493 A1 Feb. 26, 2015

(30) Foreign Application Priority Data

Aug. 23, 2013 (JP) .................................. 2013-173044

(51) Int. Cl.
*H04W 48/16* (2009.01)
*H04W 48/20* (2009.01)
(52) U.S. Cl.
CPC ............. *H04W 48/16* (2013.01); *H04W 48/20* (2013.01)
(58) Field of Classification Search
None
See application file for complete search history.

(56) References Cited

U.S. PATENT DOCUMENTS

| | | | |
|---|---|---|---|
| 2006/0045033 A1 | 3/2006 | Fukuhara | |
| 2006/0251042 A1* | 11/2006 | Mikami | H04W 48/08 370/345 |
| 2008/0205340 A1* | 8/2008 | Meylan | H04W 48/18 370/331 |
| 2011/0212731 A1* | 9/2011 | Lee | H04W 28/26 455/450 |
| 2012/0020319 A1* | 1/2012 | Song | H04B 7/0632 370/330 |
| 2013/0201863 A1* | 8/2013 | Chan | H04W 24/08 370/253 |
| 2013/0225188 A1* | 8/2013 | Seo | H04J 11/005 455/450 |
| 2013/0279362 A1* | 10/2013 | Park | H04W 24/02 370/252 |
| 2014/0080491 A1* | 3/2014 | Tinnakornsrisuphap | H04W 24/02 455/438 |
| 2014/0160937 A1* | 6/2014 | Richards | H04W 12/06 370/236 |

FOREIGN PATENT DOCUMENTS

| | | | |
|---|---|---|---|
| JP | 2005-142893 A | 6/2005 |
| JP | 2006-067178 A | 3/2006 |
| JP | 2008-263621 A | 10/2008 |

* cited by examiner

*Primary Examiner* — Derrick Ferris
*Assistant Examiner* — Jay Vogel
(74) *Attorney, Agent, or Firm* — Arent Fox LLP

(57) ABSTRACT

A system includes an apparatus; a first access point configured to transmit a first signal reaching the apparatus; and a second access point configured to transmit a second signal reaching the apparatus during a period other than the first signal is transmitted from the first access point, wherein a signal quality regarding the first access point is estimated on the basis of the first signal but except the second signal.

11 Claims, 17 Drawing Sheets

FIG. 5

| PARAMETER | VALUE |
|---|---|
| Status | Connected |
| BSSID of Serving AP | XX-XX-XX-XX-XX-XX (APx) |
| RSSI of Serving AP | -33dBm |
| Channel of serving AP | 1 |
| Number of Neighboring APs | n |
| BSSID of Neighboring AP1 | YY-YY-YY-YY-YY-YY (APy) |
| RSSI of Neighboring AP1 | -42dBm |
| Channel of Neighboring AP1 | 2 |
| ⋮ | ⋮ |
| BSSID of Neighboring APn | ZZ-ZZ-ZZ-ZZ-ZZ-ZZ (APz) |
| RSSI of Neighboring APn | -56dBm |
| Channel of Neighboring APn | 9 |

FIG. 6

| AP pair | | | | UE info | |
|---|---|---|---|---|---|
| BSSID | Ch | BSSID | Ch | RSSI of AP | RSSI of AP |
| APx | 1 | APy | 2 | -33 dBm | -42 dBm |
| APa | 5 | APc | 6 | xxx dBm | yyy dBm |
| APb | 10 | APc | 11 | zzz dBm | yyy dBm |

FIG. 7

| UE | SIR | Serving AP | | | Neighboring APn | | |
|---|---|---|---|---|---|---|---|
| | | BSSID | Ch | RSSI | BSSID | Ch | RSSI |
| UE1 | 12 dB | APx | 1 | -33 dBm | APz | 9 | -56 dBm |
| UE2 | XX dB | APxx | xxx | xxx dBm | APzz | zzz | zzz dBm |
| ⋮ | ⋮ | ⋮ | ⋮ | ⋮ | ⋮ | ⋮ | ⋮ |
| UEn | XX dB | APxx | xxx | xxx dBm | APzz | zzz | zzz dBm |

FIG. 12

| AP pair | | | | UE info | | Count | Flag |
|---|---|---|---|---|---|---|---|
| BSSID | Ch | BSSID | Ch | RSSI of AP | RSSI of AP | | |
| APx | 1 | APy | 2 | -33 dBm | -42 dBm | 3 | ON |
| APa | 5 | APc | 6 | xxx dBm | yyy dBm | | |
| APb | 10 | APc | 11 | zzz dBm | yyy dBm | | |

SYSTEM, APPARATUS, AND METHOD FOR DETERMINING SIGNAL QUALITY WITH MULTIPLE ACCESS POINTS

CROSS-REFERENCE TO RELATED APPLICATION

This application is based upon and claims the benefit of priority of the prior Japanese Patent Application No. 2013-173044, filed on Aug. 23, 2013, the entire contents of which are incorporated herein by reference.

FIELD

The embodiments discussed herein are related to a system, an apparatus, and a method.

BACKGROUND

Due to the recent evolution of hardware and software, smart phones, tablet personal computers (PCs), and other types of mobile terminals include not only a cellular wireless communication module based on code division multiple access (CDMA), long term evolution (LTE), or the like but also another type of wireless communication module that uses a wireless local area network (LAN). Communication operators are pursuing deployment of wireless LAN areas as countermeasures against traffic that are rapidly increasing on cellular networks. When a user of a smart phone or tablet PC moves to a wireless LAN area deployed by a network operator, a switchover is possible from cellular communication to wireless LAN communication.

In a technology known in the prior art, when a beacon signal transmitted from an access point on a wireless LAN is received, information about a channel used by the access point is obtained. If an overlap with the frequency band of the channel is found from the information about the channel, it is inferred that there is interference between radio signals transmitted from access points. In another known technology, a terminal is notified of a switchover to prompt it to switch its connection to an access point having a larger reception level.

The followings are reference documents; Japanese Laid-open Patent Publication No. 2005-142893, Japanese Laid-open Patent Publication No. 2006-067178, and Japanese Laid-open Patent Publication No. 2008-263621

SUMMARY

According to an aspect of the invention, a system includes an apparatus; a first access point configured to transmit a first signal reaching the apparatus; and a second access point configured to transmit a second signal reaching the apparatus during a period other than the first signal is transmitted from the first access point, wherein a signal quality regarding the first access point is estimated on the basis of the first signal but except the second signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of information used in the communication method in the embodiment;

FIG. 6 illustrates another example of information used in the communication method in the embodiment;

FIG. 7 illustrates another example of information used in the communication method in the embodiment;

FIG. 12 illustrates another example of information used in the communication method in the embodiment;

DESCRIPTION OF EMBODIMENTS

Figure 1:
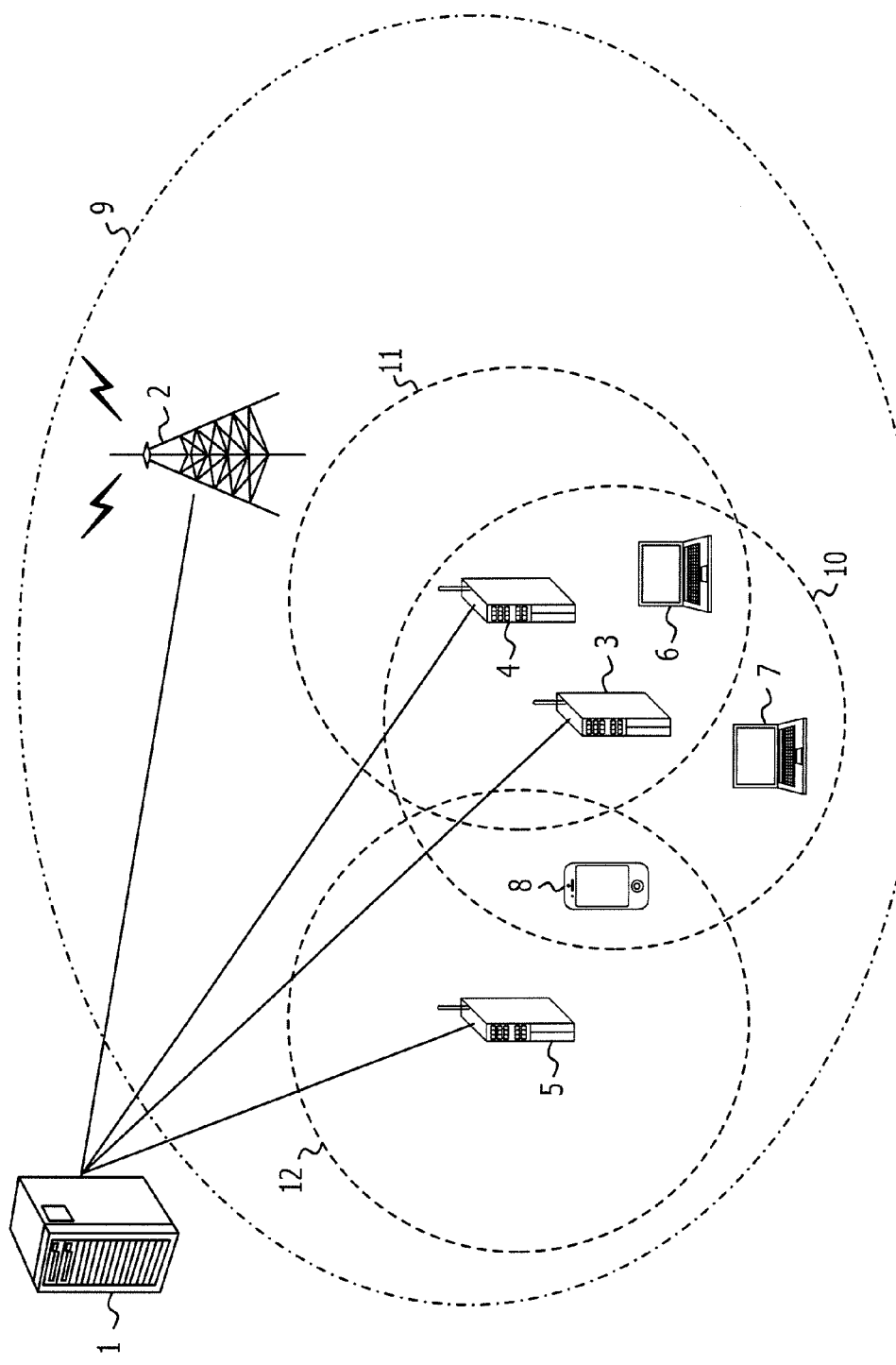
FIG. 1 illustrates an example of a communication system in an embodiment.

Considerations by the inventor will be described first. Since network operators that provide communication services have rapidly deployed wireless LAN areas, interference among wireless LANs deployed by the same network operator is being becoming a problem besides interference with wireless LANs deployed by other network operators and interference with wireless LANs operated by ordinary users. In this situation, a network operator that provides a communication infrastructure preferably not only controls a terminal so that it switches from cellular wireless access based on CDMA, LTE, or the like to access to a wireless LAN but also controls the terminal so that it switches from access to a wireless LAN to cellular wireless access according to the wireless environment of the wireless LAN.

A possible index to switch from access to a wireless LAN to cellular wireless access is the use of radio signal quality. For example, a terminal collects the received signal strength indicator (RSSI) value of a neighboring wireless LAN and its frequency (channel) information, after which a controller on the network calculates a signal-to-interference ratio (SIR) as the wireless quality of the terminal according to the information collected by the terminal. This SIR is used as signal quality. If the RSSI value of an access point on a wireless LAN to which a terminal is connected or will be connected is taken as a signal and the sum of RSSI values of other access points around this access point is taken as an interference value, an SIR is calculated according to an equation "SIR=signal value/interference value". If the SIR of a terminal, which calculated as described above, is lower than a certain threshold, the terminal may be switched from access to the wireless LAN to cellular wireless access.

Alternatively, among a plurality of terminals connected to a certain access point, a terminal having a relatively low SIR may be preferentially switched to cellular wireless access.

In wireless LAN communication, a communication protocol called Carrier Sense Multiple Access/Collision Avoidance (CSMA/CA) is used. During an operation in CSMA/CA, an access point or terminal on a certain wireless LAN checks whether there is a radio signal used in data transmission from an access point or terminal on another wireless LAN before transmitting data. If the access point or terminal confirms that there is no radio signal, the access point or terminal transmits the data. Otherwise, to avoid signal collision, the access point or terminal keeps data waiting to be transmitted.

The presence or absence of a radio signal can be checked only in a range within which a radio signal transmitted from each access point or terminal can reach a distant access point or terminal. If, for example, an access point or terminal on a certain wireless LAN is far distant from an access point or terminal on another wireless LAN, each access point or terminal fails to check for a radio signal transmitted from the distant access point or terminal, in which case CSMA/CA does not operate. Also, if there is no overlap between a frequency (channel) used by an access point or terminal on a certain wireless LAN and a frequency (channel) used by an access point or terminal on another wireless LAN around the certain wireless LAN, CSMA/CA does not operate.

A possible reason why wireless LANs use CSMA/CA is that, for example, it is assumed that an access point on a wireless LAN is movable or is placed without considering the position of another access point, as with a mobile router used by an individual, for example. If time scheduling is performed between access points in this situation, control may be complicated. Therefore, it might have been considered that to avoid signal collision, a signal is preferably transmitted while there is no signal transmitted from an access point or terminal on another wireless LAN.

FIG. 1 illustrates an example of a communication system in an embodiment. The communication system in the embodiment includes a server 1, which is an example of a controller, a base station 2 intended for cellular wireless access based on CDMA, LTE, or the like, access points (sometimes referred to below as APs) 3 to 5 on a wireless LAN, and user equipment (sometimes referred to below as UE) 6 to 8. A wireless coverage area covered by the base station 2 is an area 9. Each of the user equipment 6 to 8, positioned in the area 9, conforms to CDMA, LTE, or the like, enabling the user equipment to perform wireless communication through the base station 2. Wireless coverage areas covered by the APs 3 to 5 are respectively areas 10 to 12. If each of the user equipment 6 to 8 is positioned in an area, the user equipment can use a wireless LAN to perform wireless communication through the relevant AP in the area. The server 1 controls the user equipment 6 to 8 through the base station 2 or APs 3 to 5 so that the user equipment switches from cellular wireless access based on CDMA, LTE, or the like, the access being supported by the base station 2, to access to a wireless LAN formed by the APs 3 to 5. Alternatively, depending on the wireless environments of the wireless LAN formed by the APs 3 to 5, the server 1 controls the user equipment so that it switches from access to a wireless LAN formed by the APs 3 to 5 to cellular wireless access based on CDMA, LTE, or the like, the access being supported by the base station 2. The number of base stations 2 and their positions, the number of APs 3 to 5 and their positions, the wireless coverage areas covered by the base station 2 and APs 3 to 5, and the number of user equipment 6 to 8 and their positions are indicated only for descriptive purposes; these are not intended to be interpreted to limit the embodiment.

Measurement of radio signal quality in terms of the above-mentioned SIR will be described with reference to the communication system in FIG. 1. The user equipment 6 is positioned in the areas 10 and 11, so it can receive radio signals transmitted from the APs 3 and 4. Now it is assumed that the user equipment 6 is in communication through the AP 3. The user equipment 6 measures the RSSI value of a radio signal transmitted from the AP 3 and also measures the RSSI value of a radio signal transmitted from the AP 4. The user equipment 6 then notifies the server 1 of the measured RSSI values. The server 1 calculates the SIR of the user equipment 6 according to the RSSI values of which the server 1 has been notified. In this example, the user equipment 6 is connected to the AP 3, so the server 1 uses the RSSI value of the radio signal transmitted from the AP 3 as the signal value and the RSSI value of the radio signal transmitted from the AP 4 as the interference value to calculate the SIR according to the calculation equation described above. Although the user equipment 6 can also receive a radio signal transmitted from the user equipment 7, the SIR is calculated from radio signals transmitted from APs as an example for descriptive purposes.

The user equipment 7 is positioned only in the area 10; it can receive a radio signal transmitted from the AP 3. Now it is assumed that the user equipment 7 is in communication through the AP 3. The user equipment 7 measures the RSSI value of a radio signal transmitted from the AP 3 and then notifies the server 1 of the measured RSSI value. The server 1 calculates the SIR of the user equipment 7 according to the RSSI value of which the server 1 has been notified.

The user equipment 8 is positioned in the areas 10 and 12, so it can receive radio signals transmitted from the APs 3 and 5. Now it is assumed that the user equipment 8 is in communication through the AP 3. The user equipment 8 measures the RSSI value of a radio signal transmitted from the AP 3 and also measures the RSSI value of a radio signal transmitted from the AP 5. The user equipment 8 then notifies the server 1 of the measured RSSI values. The server 1 calculates the SIR of the user equipment 8 according to the RSSI values of which the server 1 has been notified. In this example, the user equipment 8 is connected to the AP 3, so the server 1 takes the RSSI value of the radio signal transmitted from the AP 3 as the signal value and the RSSI value of the radio signal transmitted from the AP 5 as the interference value to calculate the SIR according to the calculation equation described above.

In the calculation of the SIR of the user equipment 6, CSMA/CA, described above, on the wireless LAN is not considered. For example, it may be assumed that coverage of a radio signal from an access point on a certain wireless LAN includes an access point on another wireless LAN and that CSMA/CA operates between these access points. In this case, when transmitting data, the access point on each wireless LAN keeps data waiting to be transmitted from the access point on another wireless LAN, so interference does not occur in practice. Specifically, since the APs 3 and 4 are positioned in coverage shared by radio signals from the APs 3 and 4, so CSMA/CA operates between the APs 3 and 4. Therefore, the user equipment 6 can receive signals transmitted from the APs 3 and 4 without interference. If, in spite of this, the RSSI value of a radio signal transmitted from the AP 4 is taken as the interference value in the calculation of the SIR of the user equipment 6, the SIR of the user equipment 6 will be estimated at an excessively bad value.

However, the APs 3 and 5 are not positioned in a coverage shared by radio signals from the APs 3 and 4, so CSMA/CA does not operate between the APs 3 and 5. Therefore, signals transmitted from the APs 3 and 5 cause interference at the user equipment 8. That is, in the calculation of the SIR of the user equipment 8, when the RSSI value of a radio signal transmitted from the AP 4 is taken as the interference value, an appropriate SIR can be estimated.

Thus, to measure an appropriate SIR, it is desirable to consider whether CSMA/CA operates between an access point on a certain wireless LAN and an access point on another neighboring wireless LAN. However, an SIR may be calculated without this consideration on the assumption that all radio signal from access points on other neighboring wireless LANs cause interference. The inventor found a problem caused in this situation; even if user equipment has preferable radio signal quality in practice because CSMA/CA operates, the user equipment is decided to have poor radio signal quality and is handled so as to be switched to cellular wireless access based on CDMA, LTE, or the like, impairing a switchover of the user equipment from being appropriately controlled.

In an embodiment, therefore, when interference of signals transmitted from neighboring access points is taken into consideration, if one of these access points keeps a signal waiting to be transmitted until signal transmission from another access point is completed, signal quality is appropriately measured on the assumption that signals from these access points do not cause interference. Thus, appropriate user equipment can be switched to another wireless access point according to the actual wireless environment.

In another example, a controller acquires the RSSI value of an access point on a neighboring wireless LAN and its frequency (channel) information, user equipment connected or to be connected to an access point on a wireless LAN being capable of monitoring the RSSI value and frequency information. Then, the controller infers, from the acquired information, whether CSMA/CA operates between the relevant access points on the wireless LANs. In measurement of the SIR of the user equipment, assuming that there is no interference with a signal from an access point, on a wireless LAN, at which CSMA/CA is inferred to operate, the signal value is not included in calculation of the SIR. This enables radio signal quality to be measured with CSMA/CA on the wireless LAN taken into consideration, improving precision in measurement of radio signal quality. Thus, appropriate user equipment can be switched to another wireless access point according to the actual wireless environment. For example, it is possible to command user equipment with poor signal quality to connect to cellular wireless access based on CDMA, LTE, or the like, or another wireless access point, according to, for example, signal quality measured with CSMA/CA on the wireless LAN taken into consideration.

When the operation of CSMA/CA between a first access point on a wireless LAN and an access point on a neighboring wireless LAN is inferred in the embodiment, information about user equipment that has measured, for example, the largest RSSI value of the first access point is referenced. If there is a second access point that has a large RSSI value among RSSI values, measured by the user equipment, of access points on the neighboring wireless LAN and also has an overlapping frequency, CSMA/CA is inferred to operate between the first access point and the second access point. The user equipment that has measured the largest RSSI value of the first access point can be determined to be closer to the first access point than any other user equipment. When the RSSI value, measured by the user equipment, of the second access point is high, it can be inferred that the RSSI value of the second access point becomes large at the first access point as well. Thus, it can be inferred that the first access point is located at a position that a radio signal from the second access point can reach and the second access point is located at a position that a radio signal from the first access point can reach and that CSMA/CA operates. In the embodiment, the number of second access points as described above is not limited to one; a plurality of second access points may be inferred under some conditions.

Figure 2:
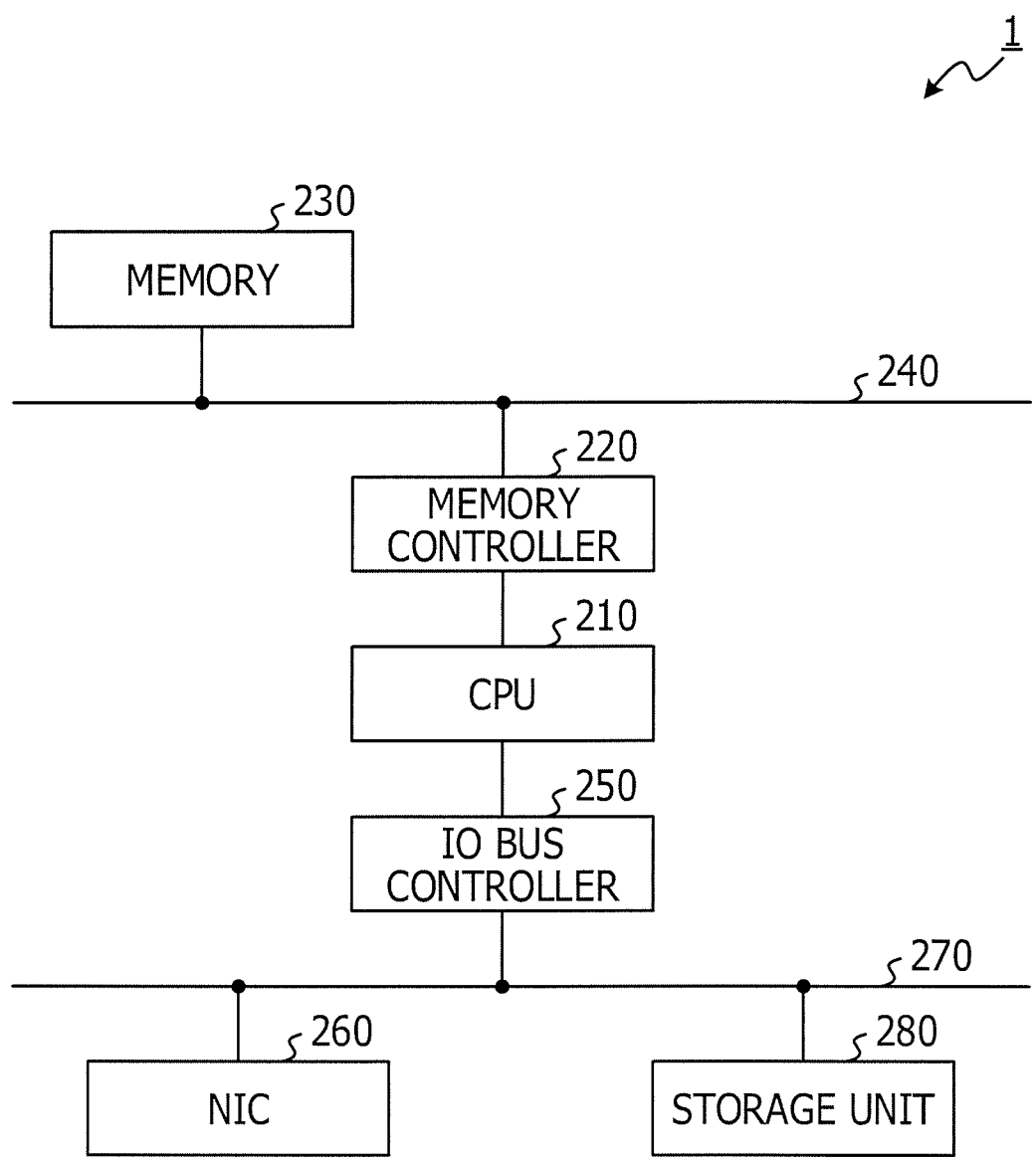
FIG. 2 illustrates an example of the hardware structure of a controller in an embodiment.

FIG. 2 illustrates an example of the hardware structure of a controller in an embodiment. The server 1, which is an example of the controller in the embodiment, includes a central processing unit (CPU) 210, a memory controller 220, a memory 230, a memory bus 240, an input-output (IO) bus controller 250, a network interface card (NIC) 260, and an IO bus 270. A storage unit 280 is connected to the IO bus 270.

The memory 230 connected to the memory bus 240 stores a program that executes various types of processing executed in the server 1. The CPU 210 reads out the program from the memory 230 through the memory controller 220 and executes various types of processing. While the CPU 210 executes the various types of processing, the memory controller 220 writes and reads data to and from the memory 230.

The CPU 210 transfers data through the IO bus controller 250 to the NIC 260 connected to the IO bus 270, and also receives data and a packet from the NIC 260. The CPU 210 reads and writes data from and to the storage unit 280, connected to the IO bus 270, through the IO bus controller 250.

The CPU 210 may include at least one CPU core to execute various types of processing. Each CPU core may include at least one processor. If the CPU 210 includes a plurality of CPU cores, the various types of processing may be executed by the plurality of CPU cores in collaboration or by any one CPU core. If each CPU core includes a plurality of processors, the various types of processing may be executed by the plurality of processors in collaboration or by any one processor.

The memory 230 is, for example, a random access memory (RAM) such as a dynamic RAM (DRAM). The memory bus 240 is, for example, a non-volatile memory such as a read-only memory (ROM) or flash memory or a magnetic disk drive such as a hard disk drive (HDD).

A structure in which the CPU 210, memory controller 220, memory 230, NIC 260, and storage unit 280 are connected to the same bus may be applied to the server 1. The functional blocks in FIG. 3 are implemented by the hardware structure in FIG. 2, and processing in FIGS. 8 to 11 and 13 to 16 is executed.

Figure 3:
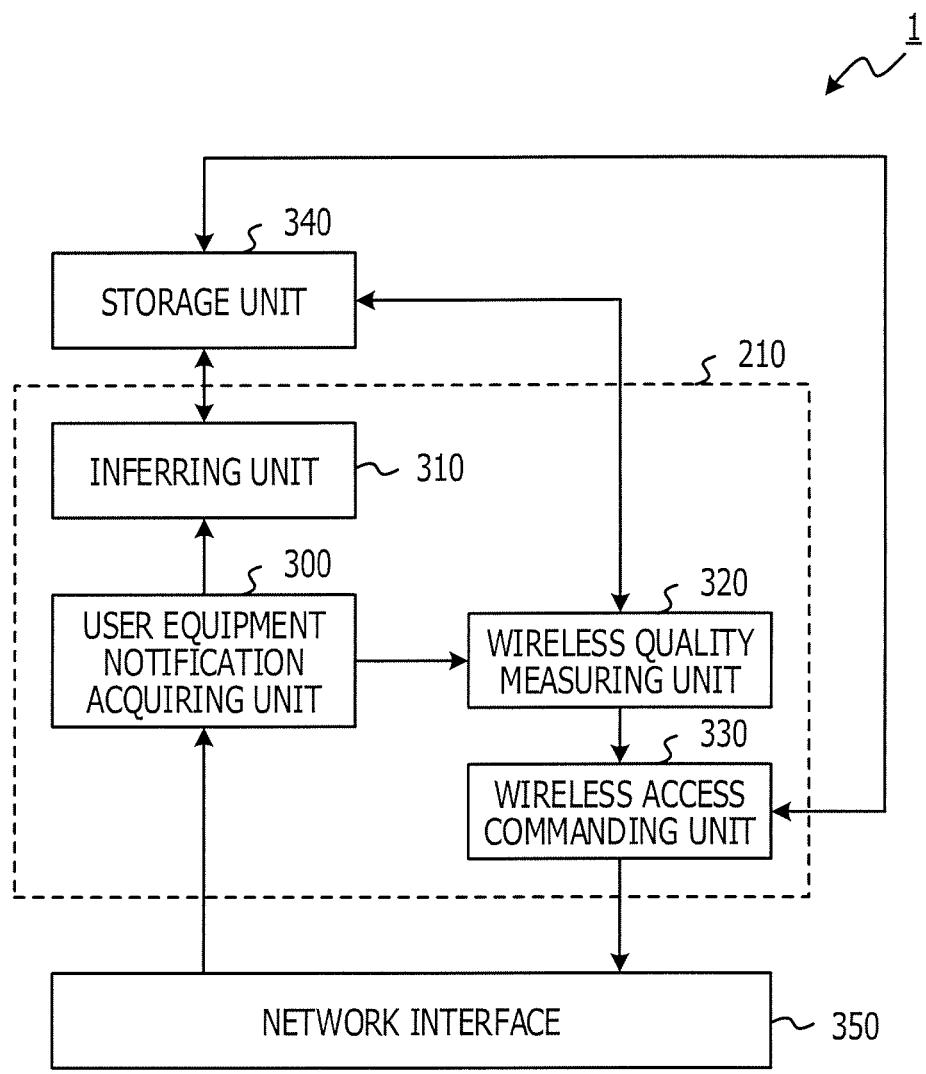
FIG. 3 illustrates an example of a functional block diagram of the controller in the embodiment.

FIG. 3 illustrates an example of a functional block diagram of the controller in the embodiment. The server 1 illustrated in FIG. 2, which is an example of the controller in the embodiment, functions as a user equipment notification acquiring unit 300, an inferring unit 310, a wireless quality measuring unit 320, and a wireless access commanding unit 330 when the program loaded in the memory 230, which is used as a working memory, is executed by the CPU 210. A storage unit 340 is implemented by the memory 230 and storage unit 280. A network interface 350 is implemented by the NIC 260.

The user equipment notification acquiring unit 300 acquires a notification from user equipment. The inferring unit 310 infers CSMA/CA between access points on wireless LANs according to the information acquired from the user equipment and information stored in the storage unit 340. The inferring unit 310 also stores the inferred result in the storage unit 340. The wireless quality measuring unit 320 measures the quality of a radio signal at the user equipment from the notification acquired from the user equipment and inferred information about CSMA/CA between the access points on the wireless LANs, the inferred information being stored in the storage unit 340. The wireless quality measuring unit 320 also stores the measured result in the storage unit 340 and notifies the wireless access commanding unit 330 of the measured result. The wireless access commanding unit 330 commands the user equipment to switch to a wireless access point as a connection destination according to the radio signal quality measured by the wireless quality measuring unit 320. The storage unit 340 stores the inferred information about CSMA/CA between the access points on the wireless LANs. The storage unit 340 can also store information about measurements of the quality of a radio signal from the currently connected user equipment. The network interface 350 receives a notification from user equipment and sends a command to the user equipment.

A communication method executed by the functional blocks in FIG. 3 will be described later in correspondence to processing illustrated in FIGS. 8 to 11 and 13 to 16.

Figure 4:
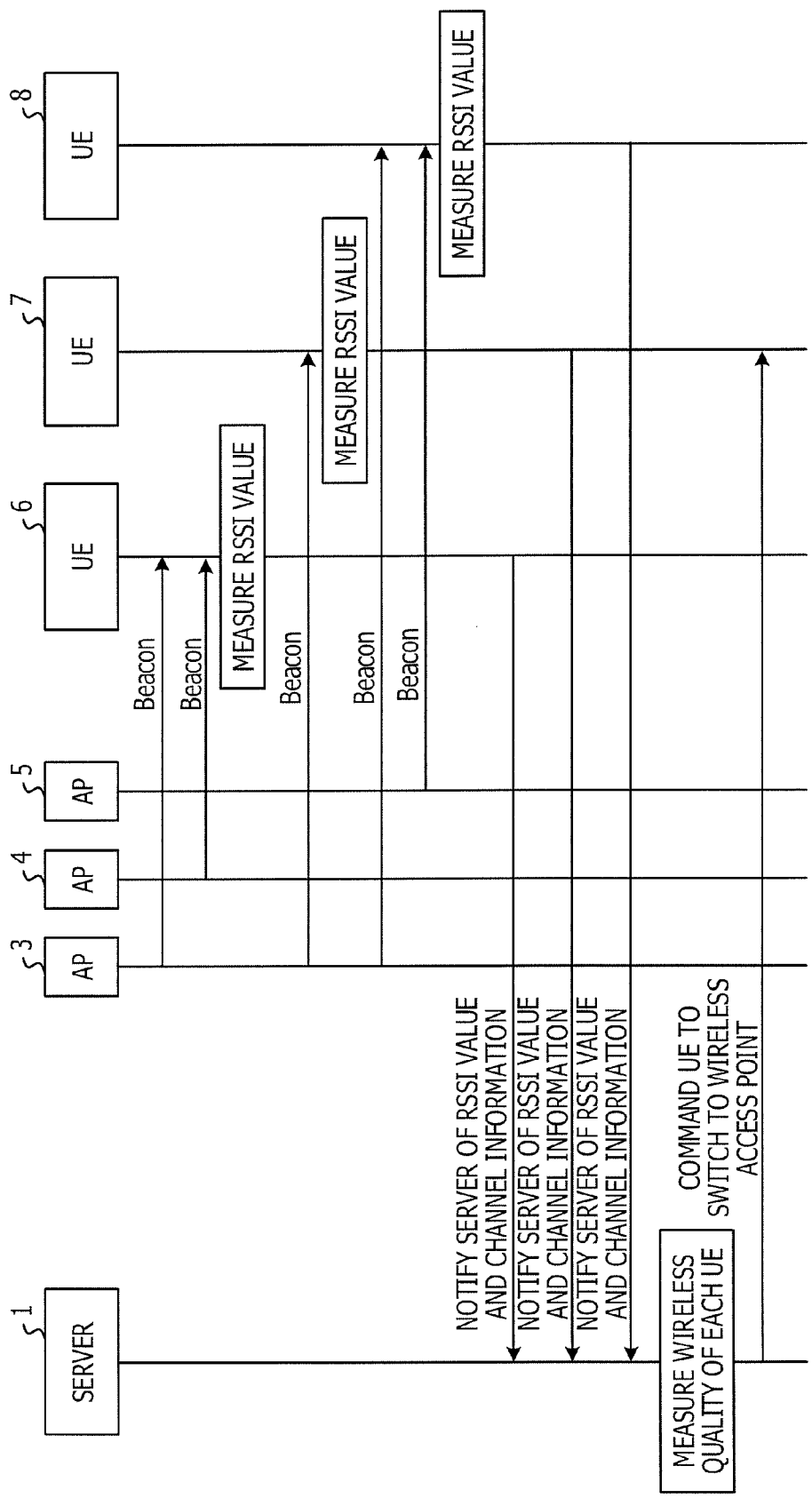
FIG. 4 illustrates an example of a communication method in the communication system in the embodiment.

FIG. 4 illustrates an example of a communication method in the communication system in the embodiment. Specifically, FIG. 4 illustrates an example of a sequence in communication executed among the server 1, APs 3 to 5, and user equipment 6 to 8 in FIG. 1 as an example of a communication method in the communication system in the embodiment. For example, the user equipment 6 can detect signals from the APs 3 and 4, so the user equipment 6 receives beacon signals transmitted from the APs 3 and 4 and measures their RSSI values according to the strengths of the beacon signals. The user equipment 6 also acquires frequency (channel) information included in the beacon signal. The user equipment 6 then notifies the server 1 of the measured RSSI values and acquired frequency (channel) information. The user equipment 7 and 8 also perform the same processing according to beacon signals transmitted from APs from which the user equipment 7 and 8 can receive signals, and notify the server 1 of the measured RSSI values and acquired frequency (channel) information. The user equipment 6 to 8 may notify the server 1 before or immediately after the user equipment 6 to 8 are connected to the APs 3 to 5. Alternatively, the user equipment 6 to 8 may periodically notify the server 1.

The server 1 collects the RSSI values of the APs 3 to 5 and their frequency (channel) information of which the server 1 has been notified by user equipment and infers the operation of CSMA/CA among the APs 3 to 5. How the operation of CSMA/CA is inferred and how the wireless quality of each user equipment is measured according to the inferred result will be described later with reference to processing illustrated in FIGS. 8 to 11 and 13 to 16. The server 1 commands user equipment with poor radio signal quality to switch from wireless access through a wireless LAN to wireless access through the base station 2 or another wireless access.

FIG. 5 illustrates an example of information used in the communication method in the embodiment. Specifically, FIG. 5 illustrates examples of messages of which the server 1 is notified by the user equipment in FIG. 1, the messages being then acquired by the server 1 in processing 801, processing 901, processing 1301, and the like and stored in the storage unit 340. In the examples of the messages in FIG. 5, each identifier managed as a parameter is associated with a value. Although messages of which the server 1 is notified are information of which the server 1 is notified by user equipment, they are exemplified as messages of which the server 1 is notified by the user equipment 6 to simplify descriptions.

The identifier that identifies an access point on a wireless LAN to which the user equipment 6 is connected or is to be connected is BSSID of Serving AP. In the example in FIG. 5, a media access control (MAC) address XX-XX-XX-XX-XX-XX, which is used as the basic service set identifier (BSSID) of this access point, is associated with BSSID of Serving AP.

The identifier Status indicates whether user equipment is connected to a wireless LAN. In the example in FIG. 5, assuming that the user equipment 6 is connected to an AP x at XX-XX-XX-XX-XX-XX, Connected is indicated as the value.

The identifier RSSI of Serving AP indicates the RSSI value of an access point on a wireless LAN to which user equipment is connected or is to be connected. In the example in FIG. 5, −33 dBm, which is an RSSI value obtained when a signal transmitted from the AP x to which the user equipment 6 is connected is measured at the user equipment 6, is associated with RSSI of Serving AP.

The identifier Channel of Serving AP indicates frequency (channel) information about an access point on a wireless LAN to which user equipment is connected or is to be connected. In the example in FIG. 5, the use of a channel 1 by the AP x to which the user equipment 6 is connected is associated with Channel of Serving AP.

The identifier Number of Neighboring APs indicates the number of access points, detected by user equipment, on neighboring wireless LANs. In the example in FIG. 5, it is indicated that the user equipment 6 has detected signals transmitted from "n" access points.

The identifier BSSID of Neighboring AP-X identifies an access point on a neighboring wireless LAN. In the example in FIG. 5, it is indicated that the user equipment 6 has detected an AP y as an access point on a neighboring wireless LAN. The MAC address YY-YY-YY-YY-YY-YY of the AP y is associated with BSSID of Neighboring AP1.

The identifier RSSI of Neighboring AP-X identifies the RSSI value of an access point X on a neighboring wireless LAN. In the example in FIG. 5, −42 dBm, which is an RSSI value obtained when a signal transmitted from the AP y detected by the user equipment 6 is measured at the user equipment 6, is associated with RSSI of Neighboring AP1.

The identifier Channel of Neighboring AP-X identifies frequency (channel) information about the AP y on a neighboring wireless LAN. In the example in FIG. 5, the use of a channel 2 by the AP 1 detected by the user equipment 6 is associated with Channel of Neighboring AP1.

As illustrated in FIG. 5, information about each access point on neighboring wireless LANs is set for "n" access points associated with Number of Neighboring APs.

FIG. 6 illustrates another example of information used in the communication method in the embodiment. Specifically, FIG. 6 illustrates an example of inferred information about CSMA/CA between access points on wireless LANs, the inferred information being stored in the storage unit 340 in FIG. 3.

In the example in FIG. 6, according to messages of which the server 1 has been notified by user equipment, it is managed that the RSSI value of an access point, on a wireless LAN, with a BSSID of APx is −33 dBm and the channel of the AP x is the channel 1, and that the RSSI value of an access point, on a wireless LAN, with a BSSID of APy is −42 dBm and the channel of the AP y is the channel 2. This information is used to infer CSMA/CA between the AP x and the AP y. If it is inferred that CSMA/CA operates as a result of processing 802, processing in FIG. 9, and other processing executed by the server 1, information about the access point pair, on wireless LANs, between which CSMA/CA is inferred to operate and the information used for this inference are retained.

Figure 16:
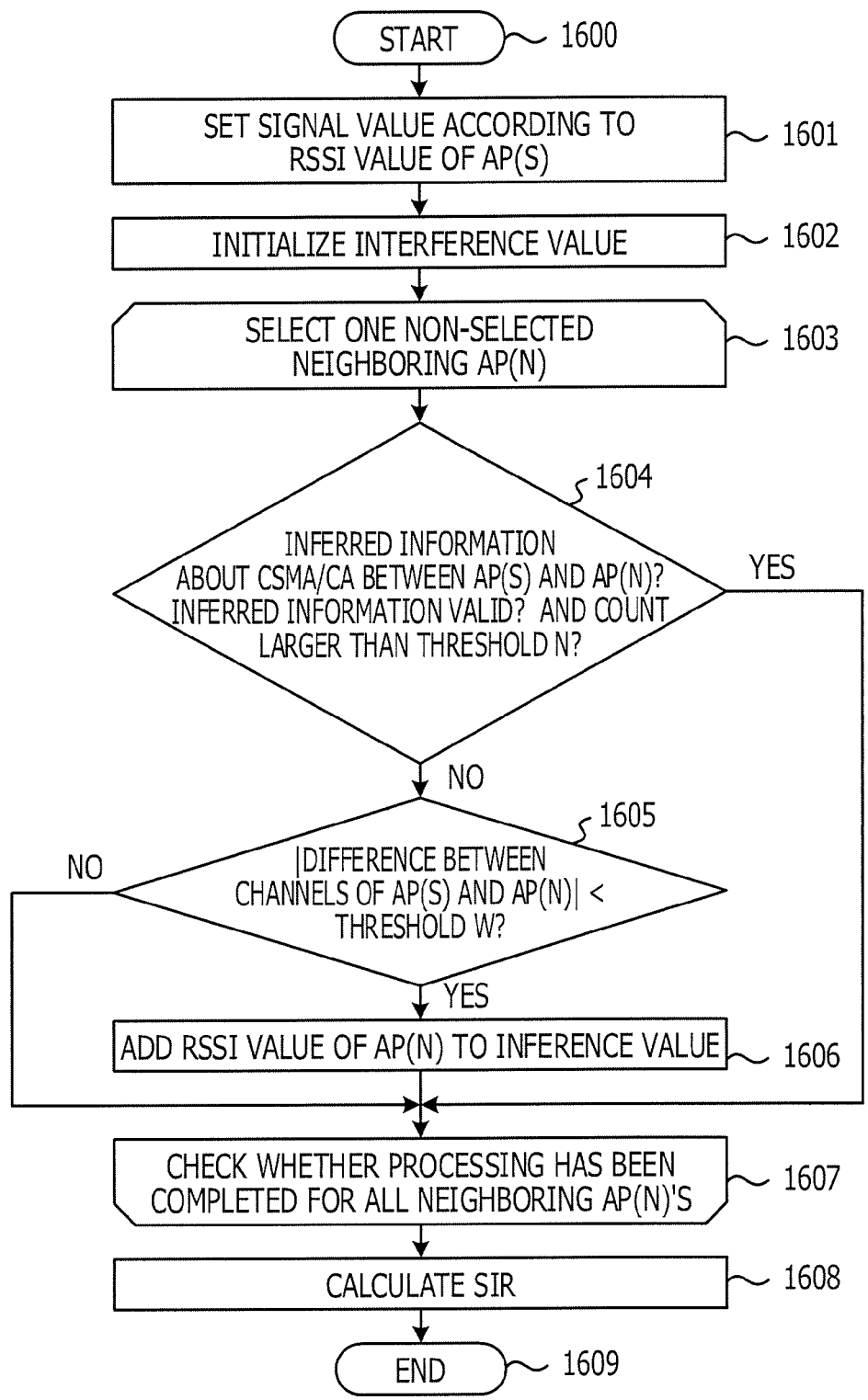
FIG. 16 illustrates another detailed example of processing in the communication method in the embodiment.

FIG. 7 illustrates another example of information used in the communication method in the embodiment. Specifically, FIG. 7 illustrates an example of quality information about a radio signal at each of UE 1 to UE n, the information being stored in the storage unit 340 in FIG. 3. In the example in FIG. 7, the SIR is used as the quality information about a radio signal at user equipment. For example, the quality of a radio signal at UE 1 is 12 dB. It is indicated that this SIR is has been measured according to the RSSI value (−33 dBm) of the AP x, to which the UE 1 is connected or is to be connected, and to the RSSI value (−56 dBm) of a neighboring AP z. The SIR at each user equipment is measured when processing 803, processing in FIG. 10, and processing in FIG. 16 are executed by the server 1. In these pieces of processing, information of which the server 1 has been notified by user equipment and the inferred information, stored in the storage unit 340, about CSMA/CA between access points on wireless LANs are referenced.

Figure 8:
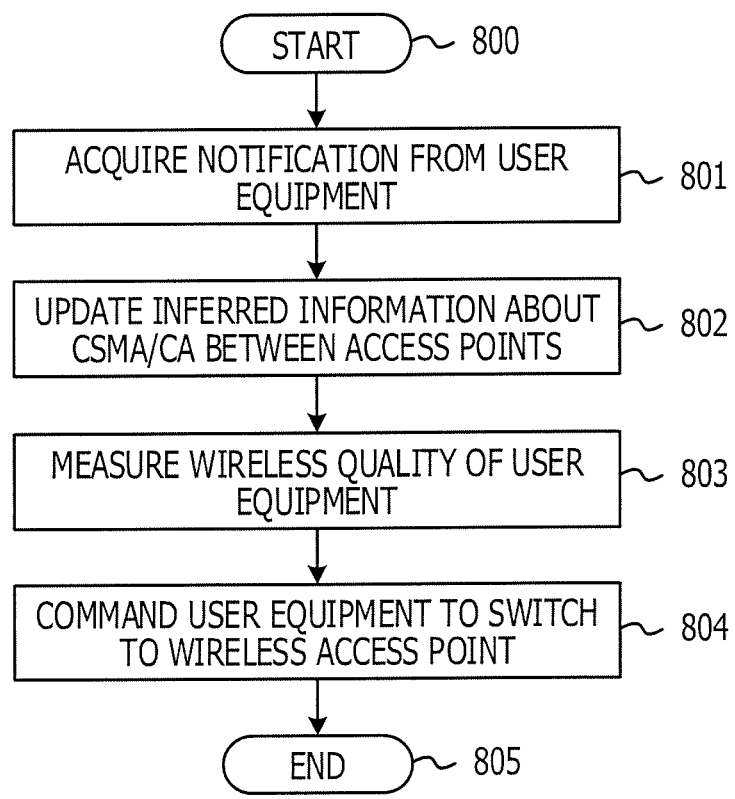
FIG. 8 illustrates an example of processing in the communication method in the embodiment.

FIG. 8 illustrates an example of processing in the communication method in the embodiment. Specifically, FIG. 8 illustrates an example of a whole flow of processing executed by the server 1 according to information of which the server 1 is notified by user equipment. Processing in FIG. 8 is started by processing 800.

Processing 801, in which a notification from user equipment is acquired, is executed by the user equipment notification acquiring unit 300. In processing 801, the RSSI value and frequency (channel) information, which are based on a beacon signal transmitted from the relevant access point and of which the server 1 has been notified by each user equipment, are acquired. The acquired information is a message illustrated in FIG. 5. The message is stored in the storage unit 340 in processing 801.

Processing 802, in which inferred information about CSMA/CA between access points is updated, is executed by the inferring unit 310. In processing 802, CSMA/CA is inferred between access points on wireless LANs according to the information acquired in processing 801 (illustrated in FIG. 5) and to inferred information about CSMA/CA between access points on wireless LANs (illustrated in FIG. 6), the inferred information being stored in the storage unit 340, after which the inferred information about CSMA/CA between the access points on the wireless LANs is updated. A detailed example of processing 802 is illustrated in FIG. 9.

Figure 10:
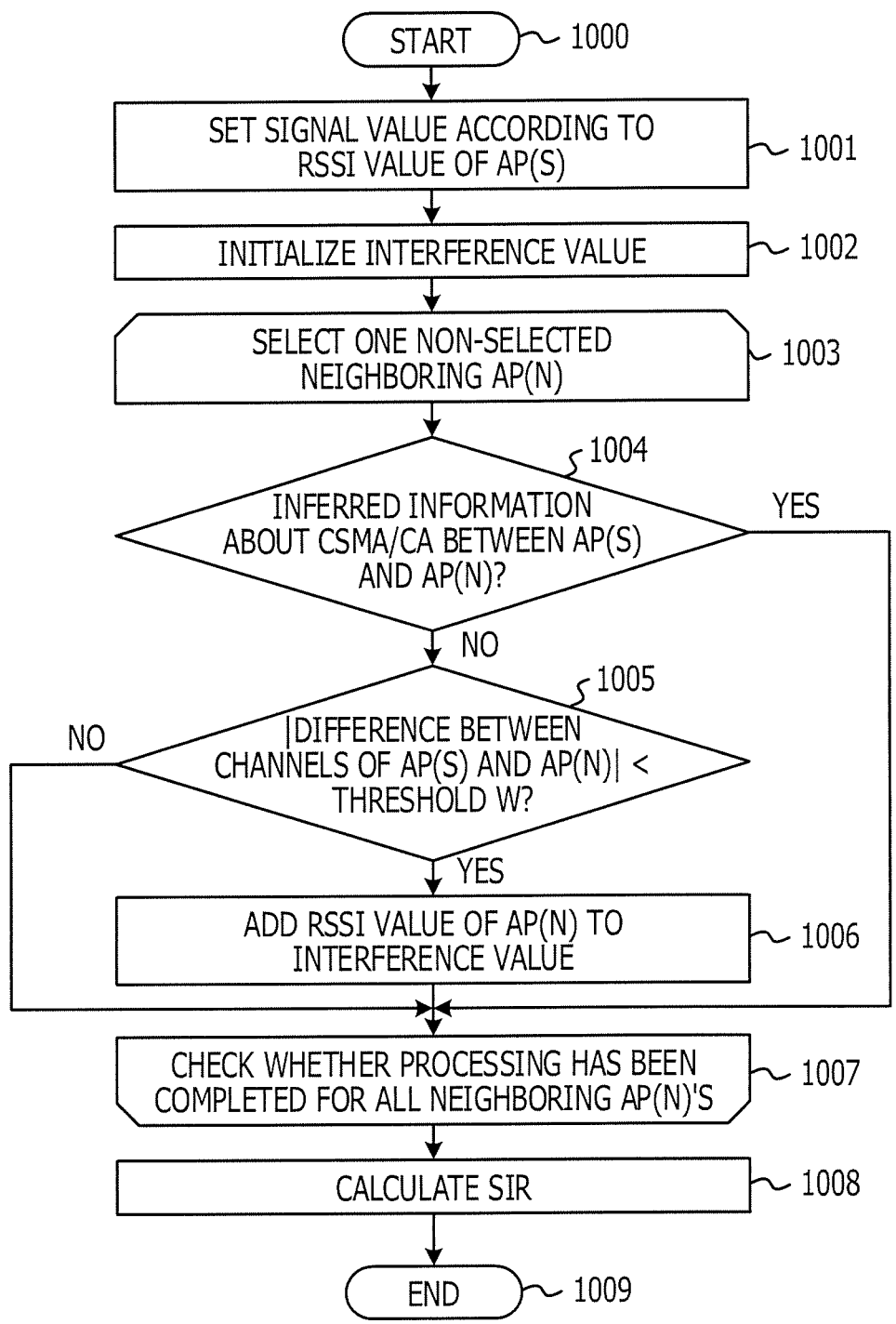
FIG. 10 illustrates another detailed example of processing in the communication method in the embodiment.

Processing 803, in which the quality of a radio signal at user equipment, is executed by the wireless quality measuring unit 320. Specifically, in processing 803, the quality of a radio signal at user equipment is measured according to the information acquired in processing 801 (illustrated in FIG. 5) and to the updated inferred information about CSMA/CA between the access points on the wireless LANs (illustrated in FIG. 6). A detailed example of processing 803 is illustrated in FIG. 10.

Figure 11:
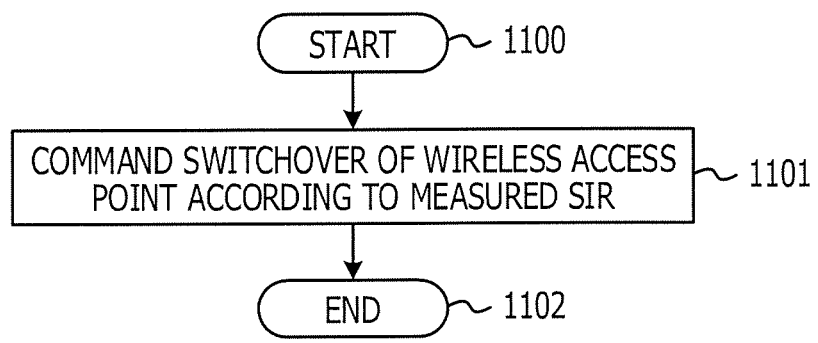
FIG. 11 illustrates another detailed example of processing in the communication method in the embodiment.

Processing 804, in which user equipment is commanded to switch to a wireless access point, is executed by the wireless access commanding unit 330. Specifically, in processing 804, the user equipment is commanded to switch to a wireless access point according to the radio signal quality measured in processing 803. Then, processing in FIG. 8 is terminated by processing 805. A detailed example of processing 804 is illustrated in FIG. 11.

Figure 9:
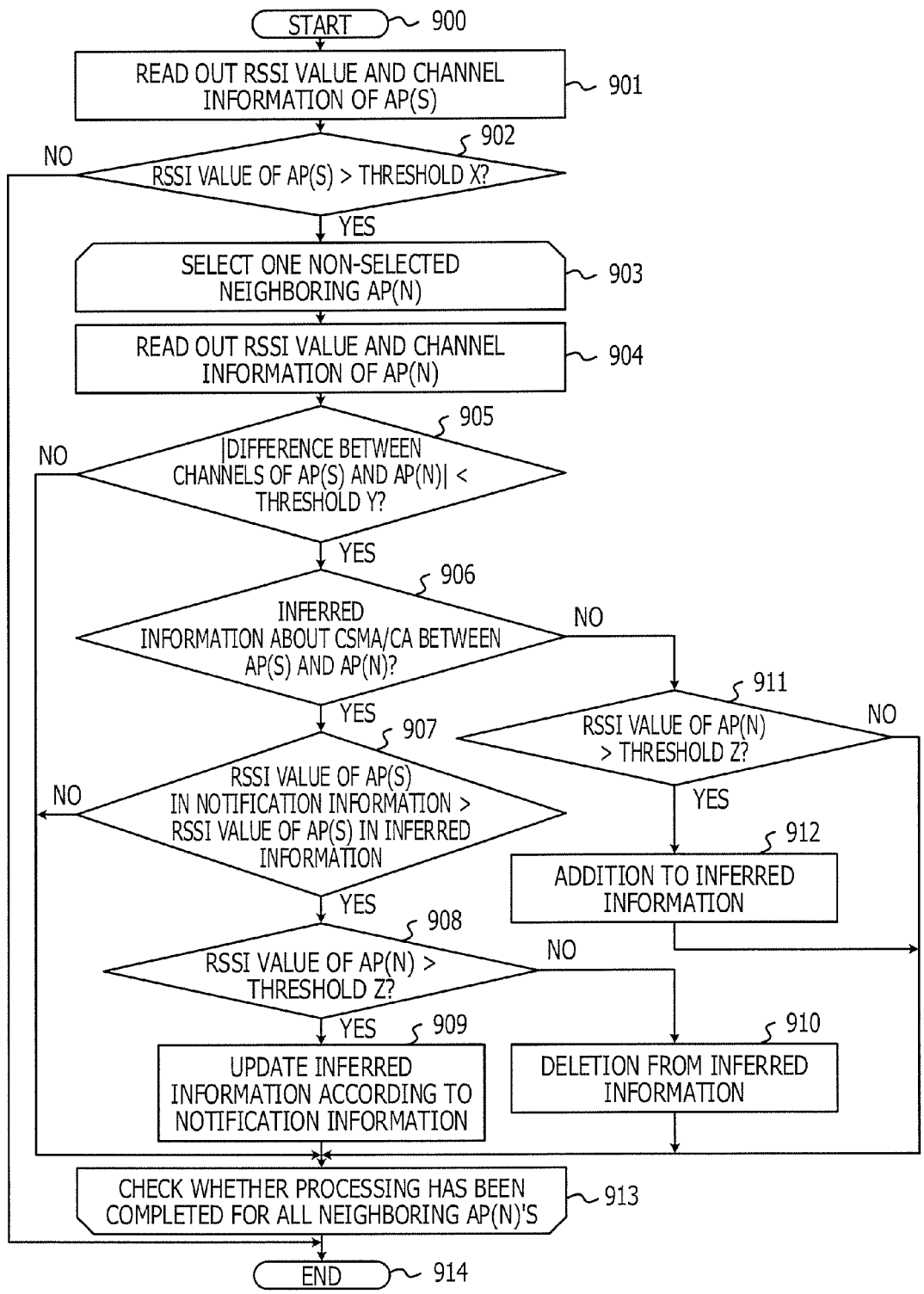
FIG. 9 illustrates a detailed example of processing in the communication method in the embodiment.

FIG. 9 illustrates a detailed example of processing in the communication method in the embodiment. Specifically, FIG. 9 illustrates a detailed example of processing 802 in FIG. 8, in which inferred information about CSMA/CA between access points is updated. Processing in FIG. 9, which is executed by the inferring unit 310, is started by processing 900 and is terminated by processing 914. In a description of processing in FIG. 9, an access point, on a wireless LAN, to which user equipment is connected or is to be connected is referred to as the AP(S), and an access point, on a neighboring wireless LAN, eligible for processing is referred to as an AP(N).

Processing 901 is executed, in which the RSSI value of the AP(S) and its frequency (channel) information are read out. Specifically, in processing 901, RSSI values and frequency (channel) information stored in the storage unit 340 in processing 801 are referred, and the RSSI value and frequency (channel) information concerning the AP(S) of user equipment eligible for processing are read out.

Processing 902 is executed, in which whether the RSSI value of the AP(S) to which the user equipment is connected is larger than a threshold X is determined. Specifically, in processing 902, the RSSI value read out in processing 901 is compared with the threshold X to decide whether the RSSI value of the AP(S) is larger than the threshold X. If the RSSI value of the AP(S) is not larger than the threshold X, the sequence proceeds to processing 914, in which the processing in FIG. 9 is terminated.

When the RSSI value of the AP(S) is compared with the threshold X, this indirectly indicates that a distance between the AP(S) and the user equipment eligible for processing is inferred. If the RSSI value of the AP(S) is larger than the threshold X, therefore, this indicates that the user equipment eligible for processing is positioned close to the AP(S). In this case, the sequence proceeds to processing 903 to infer CSMA/CA between the AP(S) and an access point on a neighboring wireless LAN. The threshold X may be appropriately set according to, for example, the coverage of a radio signal from a wireless LAN and a threshold of radio signal strength in CSMA/CA operation.

Processing 903 is then executed, in which one non-selected access point is selected from the neighboring AP(N)s of which the server 1 has been notified. Specifically, in processing 903, to infer CSMA/CA between the AP(S) and each of access points on neighboring wireless LANs, one non-selected access point is selected from the neighboring AP(N)s of which the server 1 has been notified. Processing between processing 903 and processing 913 is repeatedly executed for each neighboring AP(N)s of which the server 1 has been notified, as described later.

Processing 904 is then executed, in which the RSSI value of a neighboring AP(N) and its frequency (channel) information are read out. Specifically, in processing 904, RSSI values and frequency (channel) information stored in the storage unit 340 in processing 801 are referred, and an RSSI value and frequency (channel) information concerning the AP(N) selected in processing 903, which is one of access points on wireless LANs around the user equipment eligible for processing, are read out.

Processing 905 is then executed, in which it is decided whether the absolute value of a difference between the channels of the AP(S) and AP(N) is smaller than a threshold Y. Specifically, in processing 905, the absolute value of a difference between the channels of the AP(S) and AP(N) is calculated from the frequency (channel) information, of the AP(S), which has been read out in processing 901, and the frequency (channel) information, of the AP(N), which has been read out in processing 904. The absolute value of the difference is then compared with the threshold Y. If the absolute value of the difference is not smaller than the threshold Y, processing 913 is executed, in which it is checked whether processing has been completed for all neighboring access points of which the server 1 had been notified. If processing has been completed, the sequence proceeds to processing 914. If processing has not been completed, the sequence returns to processing 903 to execute processing for another neighboring access point on a wireless LAN. If the absolute value of the difference is smaller than the threshold Y, this indicates that a frequency used by the AP(S) and a frequency used by the AP(N) eligible for processing overlap each other. Since CSMA/CA may operate, therefore, the sequence proceeds to processing 906 to further decide whether CSMA/CA operates. The threshold Y may be appropriately set according to whether interference will occur between channels depending on the frequency band of the wireless LAN and its channel frequency interval.

Processing 906 is then executed, in which it is decided whether there is inferred information about CSMA/CA between the AP(S) and the AP(N). Specifically, in processing 906, it is decided whether the storage unit 340 stores inferred information about CSMA/CA between the AP(S) and the AP(N) eligible for processing. If it is decided that there is inferred CSMA/CA information, the sequence proceeds to processing 907. If it is decided that there is no inferred CSMA/CA information, the sequence proceeds to processing 911.

Processing 907 is then executed, in which it is decided whether the RSSI value of the AP(S) in the notification information is larger than the RSSI value of the AP(S) in the inferred information. Specifically, in processing 907, the notification information, of which the server 1 has been notified by user equipment, is compared with the inferred information stored in the storage unit 340. More specifically, the RSSI value of the AP(S) in the notification information is compared with the RSSI value of the AP(S) in the inferred information. If the RSSI value of the AP(S) in the inferred information is larger, it can be decided that the user equipment indicated in the inferred information is positioned closer to the AP(S). Therefore, the sequence proceeds to processing 913 without updating the inferred information. If processing has not been completed for all neighboring access points of which the server 1 had been notified, the sequence returns to processing 903 to execute processing for another neighboring access point on a wireless LAN. If the RSSI value of the AP(S) in the notification information is larger, it can be decided that the user equipment that has notified the server 1 of the information is positioned closer to the AP(S). Therefore, the sequence proceeds to processing 908. Due to processing 907, CSMA/CA can be inferred according to the RSSI value of which the server 1 is notified by user equipment closer to the AP(S), increasing precision in extraction of a combination of access points that are mutually positioned within the coverage of a radio signal transmitted from the opposite access point. If the RSSI value of the AP(S) in the inferred information and the RSSI value of the AP(S) in the notification information are the same, the sequence may proceed to any of processing 908 and processing 913.

Processing 908 is then executed, in which it is decided whether the RSSI value of the AP(N) is larger than a threshold Z. Specifically, in processing 908, to indirectly infer a distance between the AP(S) and the AP(N) eligible for processing, the RSSI value of the AP(N) is compared with the threshold Z, which is appropriately set according to, for example, the reaching distance of a radio signal from a wireless LAN and a threshold of radio signal strength during operation of CSMA/CA.

If it is decided in processing 908 that the RSSI value of the AP(N) is larger than the threshold Z, processing 909 is executed, in which the inferred information is updated according to the notification information. In processing 909, UE info in FIG. 6 is updated by using information of which the server 1 has been notified by the user equipment, assuming that the AP(S) and the AP(N) eligible for processing are mutually positioned within the coverage of a radio signal transmitted from the opposite access point.

If it is decided in processing 908 that the RSSI value of the AP(N) is not larger than the threshold Z, processing 910 is executed, in which information about CSMA/CA is deleted from the inferred information, assuming that CSMA/CA between the AP(S) and the AP(N) eligible for processing will not operate. The reason why information about CSMA/CA is deleted from the inferred information in processing 910 is that it can be inferred according to the notification information that the RSSI value of the AP(N) is small and thereby the AP(S) and AP(N) are not mutually positioned within the coverage of a radio signal transmitted from the opposite access point.

After processing 906, processing 911 is executed, in which it is decided whether the RSSI value of the AP(N) is larger than the threshold Z. Processing 911 is executed when the absolute value of a difference between the channels of the AP(S) and the AP(N) eligible for processing is smaller than the threshold Y and there is no inferred information about CSMA/CA between the AP(S) and the AP(N) eligible for processing. Therefore, if it is decided that the RSSI value of the AP(N) is larger than the threshold Z, the sequence proceeds to processing 912, where processing for addition to UE info in FIG. 6 is executed on the assumption that the AP(S) and the AP(N) are mutually positioned within the coverage of a radio signal transmitted from the opposite access point and thereby CSMA/CA operates. If it is decided that the RSSI value of the AP(N) is not larger than the threshold Z, it can be inferred that the AP(S) and AP(N) are not mutually positioned within the coverage of a radio signal transmitted from the opposite access point, in which case processing 913 is executed. If, in processing 913, processing has not been completed for all neighboring access points of which the server 1 had been notified, the sequence returns to processing 903 to execute processing for another neighboring access point on a wireless LAN.

FIG. 10 illustrates another detailed example of processing in the communication method in the embodiment. Specifically, FIG. 10 illustrates a detailed example of processing 803 in FIG. 8, in which wireless quality of user equipment is measured. Processing in FIG. 10, which is executed by the wireless quality measuring unit 320, is started by processing 1000 and is terminated by processing 1009. In a description of processing in FIG. 10, an access point, on a wireless LAN, to which user equipment is connected or is to be connected is referred to as the AP(S), and an access point, on a neighboring wireless LAN, eligible for processing is referred to as an AP(N). An example will be described for a case in which the SIR is used to represent wireless quality.

Processing 1001 is executed, in which a signal value is set according to the RSSI value of the AP(S) to which the user equipment is connected. Specifically, in processing 1001, the RSSI value, stored in the storage unit 340, of the AP(S) is set as the signal value.

Processing 1002 is then executed, in which the interference value is initialized. In processing 1002, an initial value may be set with noise taken into consideration.

Processing 1003 is then executed, in which one non-selected access point is selected from the neighboring AP(N)s of which the server 1 has been notified. To consider effects by radio frequency interference, on the AP(S), which is caused by each access point on neighboring wireless LANs, processing between processing 1003 and processing 1007 is repeatedly executed as many times as the number of neighboring access points of which the server 1 has been notified, as described later.

Processing 1004 is then executed, in which it is decided whether there is inferred information about CSMA/CA between the AP(S) and the AP(N). If it is decided that there is inferred information about CSMA/CA, since it has been inferred as the result of processing in FIG. 9 that interference will not occur in data transmission between the AP(S) and the AP(N). Not to include a signal from the AP(N) in signal quality calculation, processing 1007 is executed, in which it is checked whether processing has been completed for all neighboring access points of which the server 1 had been notified. If processing has been completed, the sequence proceeds to processing 1008. If processing has not been completed, the sequence returns to processing 1003 to execute processing for another neighboring access point on a wireless LAN. If it is decided that there is no inferred CSMA/CA information, the sequence returns to processing 1005. Not to include a signal from the AP(N) in signal quality calculation, the signal may not be included in calculation of the interference value. Alternatively, effects of the strength of a signal from the AP(N) may be removed from the quality of signals from all AP(N)s before signal quality is measured.

Processing 1005 is then executed, in which it is decided whether the absolute value of a difference between the channels of the AP(S) and AP(N) is smaller than the threshold W. Specifically, in processing 1005, the absolute value of a difference between the channels of the AP(S) and AP(N) is calculated from information stored in the storage unit 340. The absolute value of the difference is then compared with the threshold W. If the absolute value of the difference is not smaller than the threshold W, processing 1007 is executed. If it is found as the result of execution of processing 1007 that processing has not been completed for all neighboring access points of which the server 1 had been notified, the sequence returns to processing 1003 to execute processing for another neighboring access point on a wireless LAN. If the absolute value of the difference is smaller than the threshold W, this indicates that a frequency used by the AP(S) and a frequency used by the AP(N) eligible for processing overlap. Therefore, it is decided that interference will occur in data transmission between the AP(S) and the AP(N), causing the sequence to proceed to processing 1006. The threshold W may be appropriately set according to whether interference will occur between channels depending on the frequency band of the wireless LAN and its channel frequency interval.

Processing 1006 is then executed, in which the RSSI value of the AP(N) is added to the interference value. In processing 1006, since the execution result in processing 1005 has indicated that interference will occur in data transmission between the AP(S) and the AP(N), the RSSI value of the AP(N) is added to the interference value.

After processing has been repeatedly executed as many times as the number of neighboring AP(N)s of which the server 1 has been notified, processing 1008 is executed, in which an SIR is calculated. In the processing 1008, an SIR is calculated according to an equation "SIR=signal value/interference value". In this equation, the RSSI value of each AP(N) has been added to the interference value, the AP(N) having been decided to cause interference in data transmission to and from the AP(S) as the result of processing repeatedly executed as many times as the number of neighboring AP(N)s of which the server 1 had been notified.

FIG. 11 illustrates another detailed example of processing in the communication method in the embodiment. Specifically, FIG. 11 illustrates a detailed example of processing 804 in FIG. 8, in which the user equipment is commanded to switch to a wireless access point. Processing in FIG. 11, which is executed by the wireless access commanding unit 330, is started by processing 1100. Processing 1101 is then executed, which commands a switchover of a wireless access point according to the measured SIR, after which processing in FIG. 11 is terminated by processing 1102.

In processing 1101, a wireless access point is set for user equipment according to the SIR measured by the wireless quality measuring unit 320 and commands the user equipment to switch to the wireless access point. For example, the SIR is compared with a threshold V, according to which whether radio signal quality is poor is determined. If the SIR of user equipment is lower than the threshold V, the radio signal quality of the user equipment is determined to be poor. A setting that causes the user equipment to be connected to another wireless access point is then made and the user equipment is commanded to switch to the other wireless access point. If the SIR of user equipment is not lower than the threshold V, the user equipment may not be commanded to switch to another wireless access point. Alternatively, for example, a message may be transmitted to user equipment regardless of the SIR of the user equipment so that the user equipment is commanded according to information in the message. In another applicable example, if the number of user equipment to be connected to an access point exceeds a threshold, the user equipment having the smallest SIR or a prescribed number of user equipment having a small SIR may be commanded to switch to another wireless access point.

FIG. 12 illustrates another example of information used in the communication method in the embodiment. Specifically, FIG. 12 illustrates an example of a count, which is the number of inferences that CSMA/CA operates between access points on wireless LANs, and a flag, which indicates whether inference information is valid, in correlation to the example, in FIG. 6, of inferred information about CSMA/CA between access points on wireless LANs. If the number of inferences that CSMA/CA operates between the AP x and the AP y is 3 and the RSSI values of the AP x and AP y are thereby included in the calculation of the SIR of the user equipment, ON is correlated as the value of the flag, indicating that the inferred information is valid, so that calculation is performed on the assumption that radio signal interference will not occur between the AP x and the AP y. How the inferred information in FIG. 12 is updated will be described later together with processing in FIGS. 13 to 15.

Figure 13:
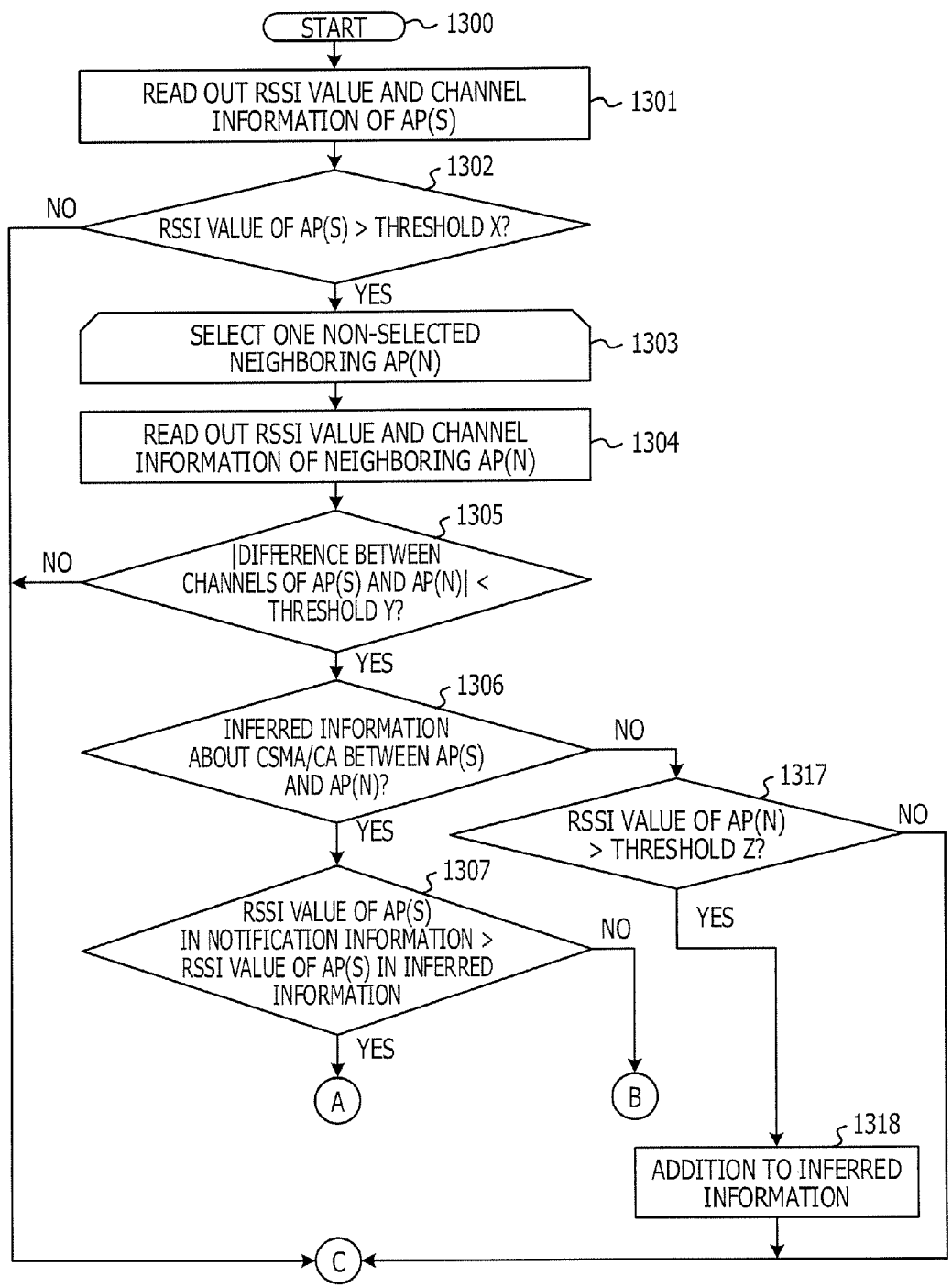
FIG. 13 illustrates part of another detailed example of processing in the communication method in the embodiment.
Figure 14:
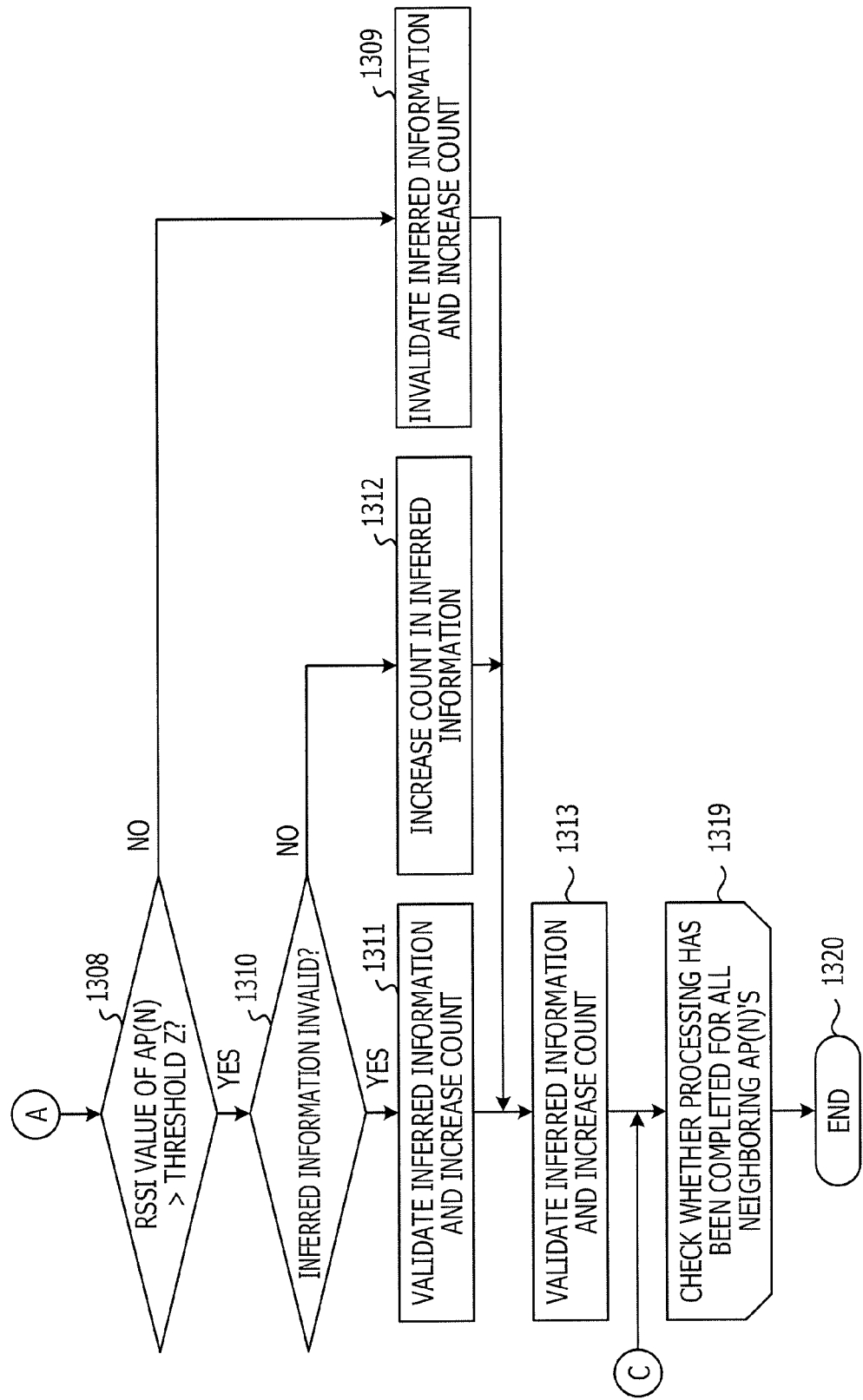
FIG. 14 illustrates part of the other detailed example of processing in FIG. 13.
Figure 15:
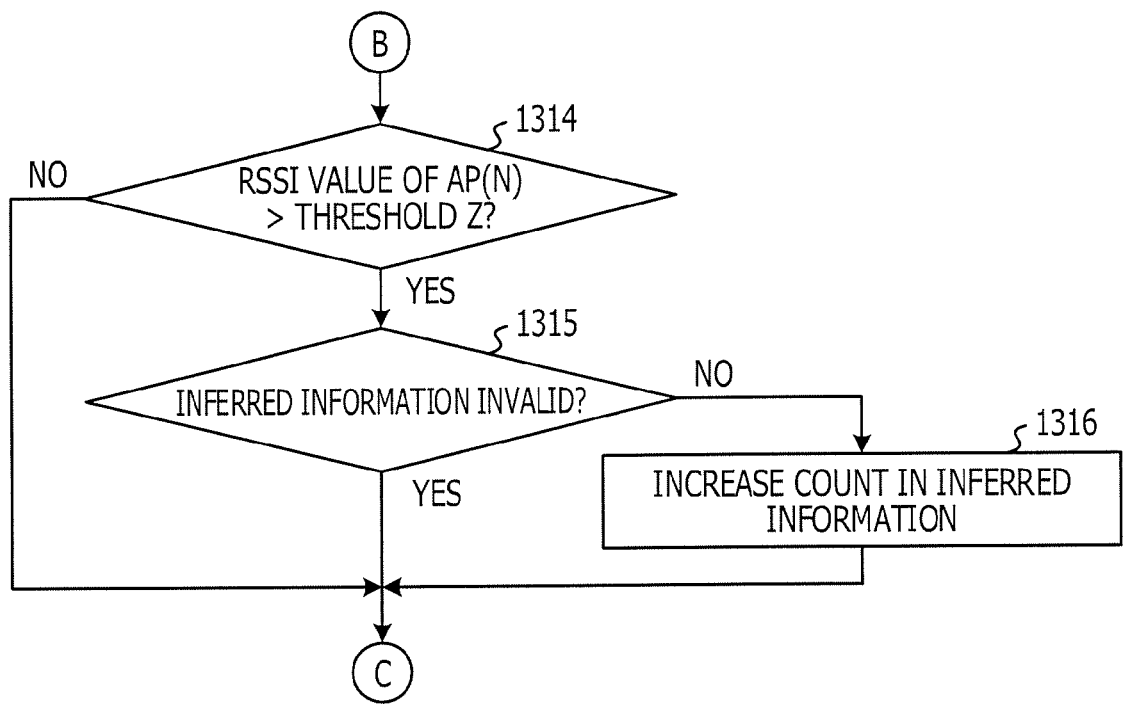
FIG. 15 illustrates part of the other detailed example of processing in FIG. 13.

FIGS. 13 to 15 illustrate another detailed example of processing in the communication method in the embodiment. Although a processing flow is divided into FIGS. 13 to 15 due to limited display spaces, the processing is another detailed example of processing 802, in which CSMA/CA between access points is updated. Processing in FIGS. 13 to 15, which is executed by the inferring unit 310, is started by processing 1300 and is terminated by processing 1320.

Processing in FIGS. 13 to 15 is partially the same as processing in FIG. 9, but differs in that a deletion from inferred information is not performed but is retained and that whether to validate or invalidate inferred information is managed according to the number of inferences that CSMA/CA operates. Thus, if the server 1 is repeatedly notified of an RSSI value and channel information by user equipment in the update of inferred information on CSMA/CA between access points, it is also possible to suppress CSMA/CA from being decided to operate between the AP(S) and the AP(N) in spite of the RSSI value of the AP(S) being lower than its last RSSI value and thereby suppress new inferred information from being created. That is, when the RSSI value of the AP(S) is high, CSMA/CA can be more reliably inferred between the AP(S) and the AP(N).

Processing 1301 is then executed, in which the RSSI value of the AP(S) and its frequency (channel information) are read out. Specifically, in processing 1301, RSSI values and frequency (channel) information stored in the storage unit 340 in processing 801 are referenced, and an RSSI value and frequency (channel) information concerning the AP(S) of the user equipment eligible for processing are read out.

Processing 1302 is executed, in which whether the RSSI value of the AP(S) to which the user equipment is connected is larger than the threshold X is determined. In processing 1302, the RSSI value read out in processing 1301 is compared with the threshold X to decide whether the RSSI value of the AP(S) is larger than the threshold X. If the RSSI value of the AP(S) is not larger than the threshold X, the sequence proceeds to processing 1319, in which the processing in FIGS. 13 to 15 is terminated.

When the RSSI value of the AP(S) is compared with the threshold X, this indirectly indicates that a distance between the AP(S) and the user equipment eligible for processing is inferred. If the RSSI value of the AP(S) is larger than the threshold X, therefore, this indicates that the user equipment eligible for processing is positioned close to the AP(S). In this case, the sequence proceeds to, processing 1303 to infer CSMA/CA between the AP(S) and an access point on a neighboring wireless LAN. The threshold X may be appropriately set according to, for example, the coverage of a radio signal from a wireless LAN and a threshold of radio signal strength in CSMA/CA operation.

Processing 1303 is then executed, in which one non-selected access point is selected from the neighboring AP(N)s of which the server 1 has been notified. To infer CSMA/CA between the AP(S) and each access point on neighboring wireless LANs, processing between processing 1303 and processing 1319 is repeatedly executed as many times as the number of neighboring access points of which the server 1 has been notified, as described later.

Processing 1304 is then executed, in which the RSSI value of a neighboring AP(N) and its frequency (channel) information are read out. Specifically, in processing 1304, RSSI values and frequency (channel) information stored in the storage unit 340 in processing 801 are referenced, and an RSSI value and frequency (channel) information concerning the AP(N) selected in processing 1303, which is one of access points on wireless LANs around the user equipment eligible for processing, are read out.

Processing 1305 is then executed, in which it is decided whether the absolute value of a difference between the channels of the AP(S) and AP(N) is smaller than the threshold Y. Specifically, in processing 1305, the absolute value of a difference between the channels of the AP(S) and AP(N) is calculated from the frequency (channel) information, of the AP(S), which has been read out in processing 1301, and the frequency (channel) information, of the AP(N), which has been read out in processing 1304. The absolute value of the difference is then compared with the threshold Y. If the absolute value of the difference is not smaller than the threshold Y, processing 1319 is executed, in which it is checked whether processing has been completed for all neighboring access points of which the server 1 had been notified. If processing has been completed, the sequence proceeds to processing 1320. If processing has not been completed, the sequence returns to processing 1303 to execute processing for another neighboring access point on a wireless LAN. If the absolute value of the difference is smaller than the threshold Y, this indicates that a frequency used by the AP(S) and a frequency used by the AP(N) eligible for processing overlap. Since CSMA/CA may operate, therefore, the sequence proceeds to processing 1306 to further decide whether CSMA/CA operates. The threshold Y may be appropriately set according to whether interference will occur between channels depending on the frequency band of the wireless LAN and its channel frequency interval.

Processing 1306 is then executed, in which it is decided whether there is inferred information about CSMA/CA between the AP(S) and the AP(N). Specifically, in processing 1306, it is decided whether the storage unit 340 stores inferred information about CSMA/CA between the AP(S) and the AP(N) eligible for processing. If it is decided that there is inferred CSMA/CA information, the sequence proceeds to processing 1307. If it is decided that there is no inferred CSMA/CA information, the sequence proceeds to processing 1317.

Processing 1307 is then executed, in which it is decided whether the RSSI value of the AP(S) in the notification information is larger than the RSSI value of the AP(S) in the inferred information. Specifically, in processing 1307, the notification information, of which the server 1 has been notified by user equipment, is compared with the inferred information stored in the storage unit 340. More specifically, the RSSI value of the AP(S) in the notification information is compared with the RSSI value of the AP(S) in the inferred information. If the RSSI value of the AP(S) in the notification information is larger, the sequence proceeds to processing 1308. If the RSSI value of the AP(S) in the inferred information is not larger, the sequence proceeds to processing 1314. Due to processing 1307, CSMA/CA can be inferred according to the RSSI value of which the server 1 is notified by user equipment closer to the AP(S).

Processing 1308 is then executed, in which it is decided whether the RSSI value of the AP(N) is larger than the threshold Z. Specifically, in processing 1308, to indirectly infer a distance between the AP(S) and the AP(N) eligible for processing, the RSSI value of the AP(N) is compared with the threshold Z, which is appropriately set according to, for example, the reaching distance of a radio signal from a wireless LAN and a threshold of radio signal strength during operation of CSMA/CA.

If it is decided in processing 1308 that the RSSI value of the AP(N) is not larger than the threshold Z, processing 1309 is executed, in which inferred information is invalidated on the assumption that CSMA/CA between the AP(S) and the AP(N) eligible for processing will not operate, and the count is initialized. Specifically, flags for a relevant access point pair in FIG. 12 are turned off and the count is set to 0. The reason for this setting is that the notification information indicates that the RSSI value of the AP(N) eligible for processing is small and thereby it can be inferred that the AP(S) and AP(N) are not mutually positioned within the coverage of a radio signal transmitted from the opposite access point. Upon completion of processing 1309, the sequence proceeds to processing 1313.

If it is decided in processing 1308 that the RSSI value of the AP(N) is larger than the threshold Z, processing 1310 is executed, in which whether inferred information is invalid is decided. Specifically, in the processing 1310, it is decided whether flags for a relevant access point pair in FIG. 12 are turned off. If it is decided that the inferred information is invalid, the sequence proceeds to processing 1311. If it is decided that the inferred information is valid, the sequence proceeds to processing 1312.

Processing 1311 is then executed, in which the inferred information is validated and the count is increased. Specifically, in processing 1311, since it has been inferred as the execution results of processing 1305 and processing 1308 that CSMA/CA for a relevant access point pair operates and the relevant access point pair is already registered in the inferred information in FIG. 12, the flags of the access point pair are turned on and the count is increased by one.

Processing 1312 is then executed, in which the count in the inferred information is increased. Specifically, in processing 1311, since the flag is already turned on in the inferred information in FIG. 12, the setting of the flag is left unchanged and the count is increased by one.

After processing 1309, 1311, or 1312, processing 1313 is executed, in which the inferred information is updated according to the notification information. Specifically, in processing 1313, the inferred information in FIG. 12 is updated by using information of which the server 1 has been notified by user equipment, according to the execution result in processing 1309, 1311, or 1312 and to the reaching distances of radio signals from the AP(S) and the AP(N) eligible for processing.

If it is decided in processing 1307 that the RSSI value of the AP(S) in the inferred information is larger, processing 1314 is executed, in which whether the RSSI value of the AP(N) is larger than the threshold Z is decided. If it is decided that the RSSI value of the AP(N) is larger than the threshold Z, the sequence proceeds to processing 1315. If it is decided that the RSSI value of the AP(N) is not larger than the threshold Z, the sequence proceeds to processing 1319. If processing has been completed for all neighboring access points of which the server 1 had been notified, the sequence returns to processing 1303 to execute processing for another neighboring access point on a wireless LAN.

In processing 1315, whether inferred information is invalid is decided. If it is decided that inferred information is valid, the count in FIG. 12 is increased by one for a relevant access point air, after which the sequence proceeds to processing 1319. If it is decided that inferred information is invalid, the sequence proceeds to processing 1319 to check whether processing has been completed for all neighboring access points of which the server 1 had been notified. If processing has not been completed, the sequence returns to processing 1303 to execute processing for another neighboring access point on a wireless LAN.

If it is decided in processing 1306 that there is no inferred CSMA/CA information, processing 1317 is executed, in which it is decided whether the RSSI value of the AP(N) is larger than the threshold Z. This processing 1317 is executed when the absolute value of a difference between the channels of the AP(S) and the AP(N) eligible for processing is smaller than the threshold Y and there is no inferred information about CSMA/CA between the AP(S) and the AP(N) eligible for processing. Therefore, if it is decided that the RSSI value of the AP(N) is larger than the threshold Z, the sequence proceeds to processing 1318, where processing for addition to UE info in FIG. 12 is executed on the assumption that the AP(S) and AP(N) are mutually positioned within the coverage of a radio signal transmitted from the opposite access point and CSMA/CA operates. If it is decided that the RSSI value of the AP(N) is not larger than the threshold Z, it can be inferred that the AP(S) and AP(N) are not mutually positioned within the coverage of a radio signal transmitted from the opposite access point, in which case the sequence proceeds to processing 1319. If, in processing 1319, processing has not been completed for all neighboring access points of which the server 1 had been notified, the sequence returns to processing 1303 to execute processing for another neighboring access point on a wireless LAN.

FIG. 16 illustrates another detailed example of processing in the communication method in the embodiment. Specifically, FIG. 16 illustrates another detailed example in processing 803 in FIG. 8, in which wireless quality of user equipment is measured. Processing in FIG. 16, which is executed by the wireless quality measuring unit 320, is started by processing 1600 and is terminated by processing 1609. In a description of processing in FIG. 16, an access point, on a wireless LAN, to which user equipment is connected or is to be connected is referred to as the AP(S), and an access point, on a neighboring wireless LAN, eligible for processing is referred to as an AP(N). An example will be described for a case in which the SIR is used to represent wireless quality.

Processing 1601 is executed, in which a signal value is set according to the RSSI value of the AP(S) to which the user equipment is connected. Specifically, in processing 1601, the RSSI value, stored in the storage unit 340, of the AP(S) is set as the signal value.

Processing 1602 is then executed, in which the interference value is initialized. In processing 1602, an initial value may be set with noise taken into consideration.

Processing 1603 is then executed, in which one non-selected access point is selected from the neighboring AP(N)s of which the server 1 has been notified. To consider effects by radio frequency interference, on the AP(S), which is caused by each access point on neighboring wireless LANs, processing between processing 1603 and processing 1607 is repeatedly executed as many times as the number of neighboring access points of which the server 1 has been notified, as described later.

Processing 1604 is then executed, in which it is decided whether there is inferred information about CSMA/CA between the AP(S) and the AP(N), the inferred information is valid, and the count is larger than a threshold N. If it is decided in processing 1604 that there is inferred CSMA/CA information, but the inferred information is not valid, this indicates that operation of CSMA/CA for a relevant access point pair is not assumed, in which case the sequence proceeds to processing 1605 to continue processing to decide whether to consider the RSSI value of the AP(N) in calculation of an interference value. In a case as well in which inferred information is valid but the count in the inferred information is not lager than the threshold N, according to which whether CSMA/CA operates is decided, operation of CSMA/CA for the relevant access point pair is not assumed, so the sequence proceeds to processing 1605 to continue processing to decide whether to consider the RSSI value of the AP(N) in calculation of an interference value. If inferred information is valid and the count is larger than the threshold N, it is decided that CSMA/CA operates between relevant access points. As a result, when an SIR is calculated, a signal from the AP(N) is not included in calculation of signal quality, that is, for example, the RSSI value of the AP(N) is not added to the interference value. In this case, processing 1607 is executed, in which it is checked whether processing has been completed for all neighboring access points of which the server 1 had been notified. If processing has been completed, the sequence proceeds to processing 1608. If processing has not been completed, the sequence returns to processing 1603 to execute processing for another neighboring access point on a wireless LAN. As an example not to include a signal from an AP(N) in signal quality calculation, effects of the strength of a signal from the AP(N) may be removed from the quality of all signals before signal quality is measured.

Processing 1605 is then executed, in which it is decided whether the absolute value of a difference between the channels of the AP(S) and AP(N) is smaller than the threshold W. Specifically, in processing 1605, the absolute value of a difference between the channels of the AP(S) and AP(N) is calculated from information stored in the storage unit 340. The absolute value of the difference is then compared with the threshold W. If the absolute value of the difference is not smaller than the threshold W, processing 1607 is executed, in which it is checked whether processing has been completed for all neighboring access points of which the server 1 had been notified. If processing has not been completed, the sequence returns to processing 1603 to execute processing for another neighboring access point on a wireless LAN. If the absolute value of the difference is smaller than the threshold W, this indicates that a frequency used by the AP(S) and a frequency used by the AP(N) eligible for processing overlap. Therefore, it is decided that interference will occur in data transmission between the AP(S) and the AP(N), causing the sequence to proceed to processing 1606. The threshold W may be appropriately set according to whether interference will occur between channels depending on the frequency band of the wireless LAN and its channel frequency interval.

Processing 1606 is then executed, in which the RSSI value of the AP(N) is added to the interference value. In processing 1606, since the execution result in processing 1605 has indicated that interference will occur in data transmission between the AP(S) and the AP(N), the RSSI value of the AP(N) is added to the interference value.

After processing has been repeatedly executed as many times as the number of neighboring AP(N)s of which the server 1 has been notified, processing 1608 is executed, in which an SIR is calculated. In the processing 1608, an SIR is calculated according to an equation "SIR=signal value/interference value". In this equation, the RSSI value of each AP(N) has been added to the interference value, the AP(N) having been decided to cause interference in data transmission to and from the AP(S) as the result of processing repeatedly executed as many times as the number of neighboring AP(N)s of which the server 1 had been notified.

Figure 17:
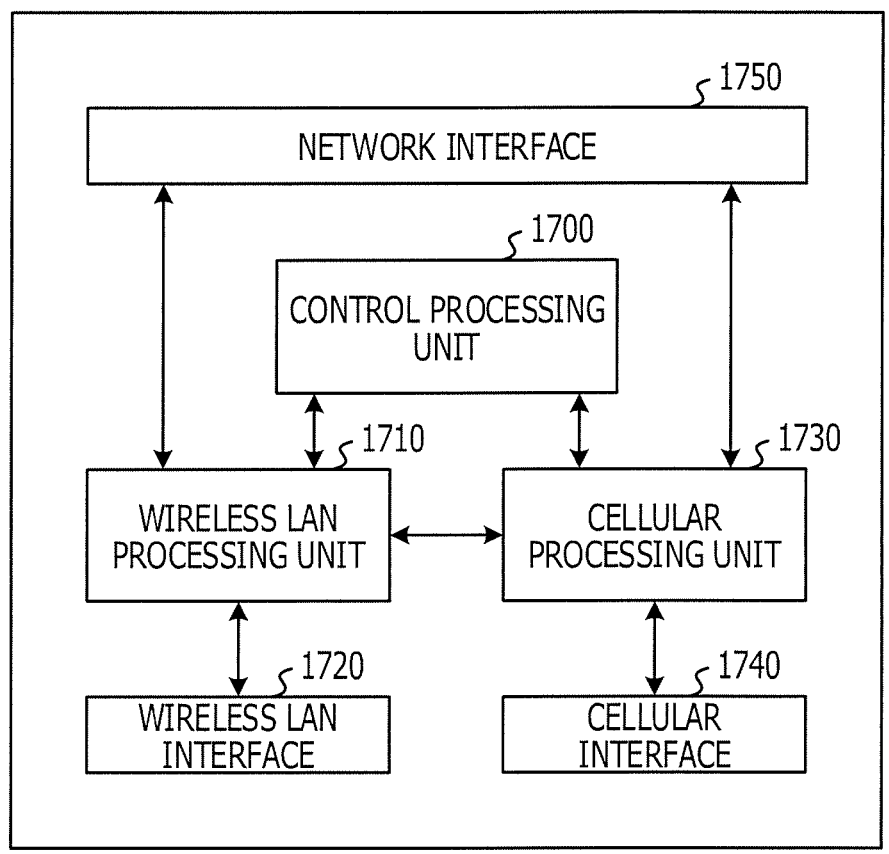
FIG. 17 illustrates another example of the base station in the embodiment in FIG. 1.

FIG. 17 illustrates another example of the base station in the embodiment. This base station is, for example, a femto base station. The base station has functions of the server 1, which is an example of a controller, functions of an access point on a wireless LAN, and functions of a cellular base station based on CDMA, LTE, or the like. Specifically, functions of the server 1 are implemented by a control processing unit 1700; functions of access points, such as AP 3, on a wireless LAN are implemented by a wireless LAN processing unit 1710 and a wireless LAN interface 1720; functions of the base station 2 are implemented by a cellular processing unit 1730 and a cellular interface 1740. A network interface 1750 is implemented by the NIC 260. The above-mentioned functions may be implemented by using the hardware structure in FIG. 3. The SIR of each user equipment is measured in this base station. According to the measured SIR, a switchover is made from wireless access through the wireless LAN processing unit 1710 and wireless LAN interface 1720 to wireless access through the cellular processing unit 1730 and cellular interface 1740.

In the embodiments described above, when interference of signals transmitted from neighboring access points is taken into consideration, if one of these access points keeps a signal waiting to be transmitted until signal transmission from another access point is completed, signal quality is appropriately measured on the assumption that signals from these access points do not cause interference. Thus, appropriate user equipment can be switched to another wireless access point according to the actual wireless environment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:

an apparatus;

a first access point configured to transmit a first signal to the apparatus;

a second access point configured to transmit a second signal to the apparatus; and a server device, wherein the apparatus is configured to:

receive the first signal and the second signal, measure a first signal strength of the first signal and a second strength of the second signal, detect a first frequency of the first signal and a second frequency of the second signal, and notify the server device of the first signal strength, the second strength, the first frequency and the second frequency, and the server device is configured to:

determine whether the measured first signal strength is greater that a first threshold value, determine whether a difference between the first frequency and the second frequency is less than a second threshold value, determine whether the measured second signal strength is greater than a third threshold value, when it is determined that the measured first signal strength is greater than the first threshold value, that the difference between the first frequency and the second frequency is less than the second threshold value, and that the measured second signal strength is greater than the third threshold value, determine that the first access point controls a transmitting timing of the first signal so as not to overlap a transmitting timing of the second signal, when it is determined that the first access point controls the transmitting timing of the first signal so as not to overlap the transmitting timing of the second signal, determine a signal quality of the first signal on the basis of the first signal strength while not using the second signal strength, when it is determined that the first access point does not control the transmitting timing of the first signal so as not to overlap the transmitting timing of the second signal, determine the signal quality of the first signal using both the first signal strength and the second signal strength, and transmit, to the apparatus, a command indicating an access destination based on the determined signal quality.

2. The system of claim 1, further comprising:
a third access point configured to be capable of transmitting a third signal for the apparatus during the first signal is transmitted from the first access point,
wherein the signal quality is determined on the basis of the first signal and the third signal.

3. A server device comprising:
a memory;
an interface device configured to communicate with a terminal device; and
a processor coupled to the memory and the interface device and configured to:
acquire a first signal strength of a first signal transmitted from a first access point to the terminal device, a second strength of a second signal transmitted from a second access point to the terminal device, a first frequency of the first signal and a second frequency of the second signal, and
determine whether the first signal strength is greater that a first threshold value,
determine whether a difference between the first frequency and the second frequency is less than a second threshold value,
determine whether the second signal strength is greater than a third threshold value,
when it is determined that the first signal strength is greater than the first threshold value, that the difference between the first frequency and the second frequency is less than the second threshold value, and that the second signal strength is greater than the third threshold value, determine that the first access point controls a transmitting timing of the first signal so as not to overlap a transmitting timing of the second signal,
when it is determined that the first access point controls the transmitting timing of the first signal so as not to overlap the transmitting timing of the second signal, determine a signal quality of the first signal on the basis of the first signal strength while not using the second signal strength,
when it is determined that the first access point does not control the transmitting timing of the first signal so as not to overlap the transmitting timing of the second signal, determine the signal quality of the first signal using both the first signal strength and the second signal strength, and
control the interface device to transmit, to the terminal device, a command indicating an access destination based on the determined signal quality.

4. The server device of claim 3, wherein
the processor is configured to determine the signal quality regarding the first access point on the basis of the first signal and a third signal for the the server device, the third signal being transmitted from a third access point during the first signal is transmitted from the first access point.

5. The server device of claim 3, wherein
the processor is configured to:
determine whether the first frequency and the second frequency overlap each other.

6. The server device of claim 5, wherein
the processor is configured to:
determine the signal quality when the second signal strength of the second signal equals to or larger than a specific value.

7. A method comprising:
acquiring, at a server device, a first signal strength of a first signal transmitted from a first access point to an apparatus, a second strength of a second signal transmitted from a second access point to the apparatus, a first frequency of the first signal and a second frequency of the second signal;
determining whether the first signal strength is greater that a first threshold value;
determining whether a difference between a first frequency of the first signal and a second frequency of the second signal is less than a second threshold value;
determining whether the second signal strength is greater than a third threshold value;
when it is determined that the first signal strength is greater than the first threshold value, that the difference between the first frequency and the second frequency is less than the second threshold value, and that the second signal strength is greater than the third threshold value, determining that the first access point controls a transmitting timing of the first signal so as not to overlap a transmitting timing of the second signal;
when it is determined that the first access point controls the transmitting timing of the first signal so as not to overlap the transmitting timing of the second signal, determining a signal quality of the first signal on the basis of the first signal strength while not using the second signal strength,
when it is determined that the first access point does not control the transmitting timing of the first signal so as not to overlap the transmitting timing of the second signal, determining the signal quality of the first signal using both the first signal strength and the second signal strength; and
transmit, from the server device to the apparatus, a command indicating an access destination based on the determined signal quality.

8. The method of claim 7, wherein
the signal quality is determined on the basis of the first signal and a third signal for the apparatus, the third signal being transmitted from a third access point during the first signal is transmitted from the first access point.

9. The method of claim 7, further comprising:
determining whether the first frequency and the second frequency overlap each other.

10. The method of claim 9, further comprising:
determining the signal quality when the second signal strength of the second signal equals to or larger than a specific value.

11. The system of claim 1, wherein the processor is configured to determine the signal quality based on determination whether the first frequency and the second frequency overlap each other.

\* \* \* \* \*